US010505425B2

(12) United States Patent
Huber et al.

(10) Patent No.: US 10,505,425 B2
(45) Date of Patent: *Dec. 10, 2019

(54) INSULATION SYSTEM FOR ELECTRICAL MACHINES

(71) Applicant: Siemens Aktiengesellschaft, Munich (DE)

(72) Inventors: Juergen Huber, Erlangen (DE); Bernhard Klaussner, Nuremberg (DE); Dieter Schirm, Breitenguessbach (DE); Matthias Uebler, Ursensollen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 252 days.

This patent is subject to a terminal disclaimer.

(21) Appl. No.: 15/515,807

(22) PCT Filed: Sep. 7, 2015

(86) PCT No.: PCT/EP2015/070341
§ 371 (c)(1),
(2) Date: Mar. 30, 2017

(87) PCT Pub. No.: WO2016/050450
PCT Pub. Date: Apr. 7, 2016

(65) Prior Publication Data
US 2017/0310184 A1 Oct. 26, 2017

(30) Foreign Application Priority Data
Sep. 30, 2014 (DE) .................. 10 2014 219 844

(51) Int. Cl.
H02K 3/30 (2006.01)
H01B 3/40 (2006.01)
H02K 3/40 (2006.01)
H02K 15/12 (2006.01)

(52) U.S. Cl.
CPC .............. *H02K 3/30* (2013.01); *H01B 3/40* (2013.01); *H02K 3/40* (2013.01); *H02K 15/12* (2013.01)

(58) Field of Classification Search
CPC . H02K 3/30; H02K 3/40; H02K 15/12; H01B 3/40; C08G 59/5073
USPC ......................................................... 523/211
See application file for complete search history.

(56) References Cited

U.S. PATENT DOCUMENTS

| 3,759,866 A * | 9/1973 | Rogers, Jr. et al. ......................... C08G 59/226 523/427 |
| 3,808,086 A | 4/1974 | Mosimann et al. .......... 442/296 |
| 4,336,363 A | 6/1982 | Crivello ........................ 526/333 |
| 5,013,814 A | 5/1991 | Roth et al. ...................... 528/90 |
| 5,341,561 A | 8/1994 | Schorm et al. ................. 29/596 |
| 6,903,174 B2 | 6/2005 | Harvey et al. ................ 526/273 |
| 10,087,198 B2 * | 10/2018 | Brockschmidt ........ C08G 59/42 |
| 2007/0252449 A1 * | 11/2007 | Ikeda ....................... H01B 3/40 310/45 |
| 2009/0230360 A1 | 9/2009 | Komuro et al. .............. 252/500 |
| 2015/0361103 A1 | 12/2015 | Brockschmidt et al. ..... 523/218 |

FOREIGN PATENT DOCUMENTS

| CN | 1844237 A | 10/2006 | ............. C08L 63/10 |
| DE | 2215206 A1 | 10/1972 | ............. H01B 3/04 |
| DE | 69433319 T2 | 9/2004 | ............. C08F 110/00 |
| DE | 102013201054 A1 | 7/2014 | ............. C08K 3/14 |
| EP | 0379464 A1 | 7/1990 | ............. C07C 381/12 |
| RU | 2072115 C1 | 1/1997 | ............. B32B 27/04 |
| RU | 2009121714 A | 12/2010 | ............. H01B 3/40 |
| WO | 2014/118077 A2 | 8/2014 | ............. C07F 3/06 |
| WO | 2016/050450 A1 | 4/2016 | ............. H01B 3/40 |

OTHER PUBLICATIONS

Russian Office Action, Application No. 2017110217/07, 6 pages, dated May 14, 2018.
German Office Action, Application No. 102014219844.5, 8 pages, dated Jun. 12, 2015.
International Search Report and Written Opinion, Application No. PCT/EP2015/070341, 17 pages, dated Jan. 8, 2016.

* cited by examiner

*Primary Examiner* — Hannah J Pak
(74) *Attorney, Agent, or Firm* — Slayden Grubert Beard PLLC

(57) ABSTRACT

The present disclosure relates to electrical machines. The teachings thereof may be embodied in insulation systems for electrical machines, more particularly in the high-voltage range, for example, in an insulation system for electrical machines including: an insulator comprising a porous insulating material; an impregnator comprising a catalytically or thermally curable resin material having oxirane functionalities, or a mixture of different reactive resin materials having oxirane functionalities; and at least one thermally activatable or encapsulated hardener material.

10 Claims, No Drawings

INSULATION SYSTEM FOR ELECTRICAL MACHINES

CROSS-REFERENCE TO RELATED APPLICATIONS

This application is a U.S. National Stage Application of International Application No. PCT/EP2015/070341 filed Sep. 7, 2015, which designates the United States of America, and claims priority to DE Application No. 10 2014 219 844.5 filed Sep. 30, 2014, the contents of which are hereby incorporated by reference in their entirety.

TECHNICAL FIELD

The present disclosure relates to electrical machines. The teachings thereof may be embodied in insulation systems for electrical machines, more particularly in the high-voltage range.

BACKGROUND

Electrical machines, especially rotating electrical machines, typically contain an electrical winding within a laminated core. The winding comprises electrical leads (possibly already provided with primary insulation) and solid insulating materials as their principal insulation. Without further measures, there is no compact connection between the laminated core, the leads, and the principal insulation, leaving gaps and voids. On operation under atmospheric conditions, these regions are filled with air. Particularly with applications in the high-voltage range, this is unallowable, since partial electrical discharges would destroy the insulation within a very short time. This leads to the failure of the electrical machine.

To avoid gaps and voids, the winding is generally impregnated with an impregnating resin or impregnating varnish. The impregnating resin fills the voids and gaps and penetrates, where there is porosity, into the solid porous materials. Certain solid insulating materials such as mica tapes, insulating papers, or nonwoven webs are made extra-porous, to absorb the impregnating resin. In the prior art, mixtures of epoxy resins and liquid, cycloaliphatic acid anhydrides are used for the impregnation. The acid anhydrides here serve as hardeners and at the same time lower the viscosity, which is beneficial for rapid and complete impregnation. Using the liquid, cycloaliphatic acid anhydrides requires safety measures.

SUMMARY

The present disclosure may be employed to provide a hardener, as a substitute for the acid anhydrides, that is also suitable for the liquid impregnation of windings. Some embodiments may include a insulation system for electrical machines, comprising a solid and porous insulating material and a catalytically and/or thermally curable impregnating resin, wherein the impregnating resin comprises any desired reactive resin having oxirane functionalities, or a mixture of different reactive resins having oxirane functionalities, and the insulation system comprises at least one thermally activatable and/or encapsulated hardener component.

In some embodiments, the at least one hardener component is deposited at least partially in the pores of the solid insulating material.

In some embodiments, the at least one hardener component is at least partially thermally activatable and in solution in the impregnating resin.

In some embodiments, the hardener component induces ionic, i.e., cationic or anionic, polymerization of the reactive resin.

Some embodiments comprise a reactive diluent.

Some embodiments comprise a reactive diluent in an amount of 0.01 to 50 wt %.

In some embodiments, the reactive diluent is selected from the group of the following compounds: cyclic organic carbonates, cyclic ethers, diols, and/or polyols.

In some embodiments, the hardener component is selected from the group of the following compounds: organic salts, such as organic ammonium, sulfonium, phosphonium, iodonium, or imidazolium salts, metal complex compounds, tertiary amines, imidazole compounds, and/or organic heterocycles.

In some embodiments, the onset temperature of the hardener component, the opening temperature for the encapsulation, and/or the temperature for the release of the hardener component from the porous solid is in the region of 35° C. and 95° C., more particularly in the region of 50° C. and 80° C.

Some embodiments may be employed in an electrical coil.

DETAILED DESCRIPTION

The teachings of the present disclosure may be embodied in an insulation system for electrical machines, comprising a solid and porous insulating material and a catalytically and/or thermally curable impregnating resin, wherein the impregnating resin comprises any desired reactive resin having oxirane functionalities, or a mixture of different reactive resins having oxirane functionalities, and the insulation system comprises at least one thermally activatable and/or encapsulated hardener component.

In some embodiments, the at least one hardener component is at least partially deposited in the pores of the solid insulating material.

In some embodiments, the at least one hardener component is at least partially thermally activatable and in solution in the impregnating resin. The hardener components may constitute compounds which induce ionic (cationic or anionic) polymerization of the reactive resin.

In some embodiments, the impregnating resin system comprises a diluent, thus influencing the rheology, to set a viscosity of less than 100 mPas, less than 50 mPas, or less than 35 mPas, at 65° C. Diluents used are, for example, cyclic organic carbonates or mixtures thereof. Propylene carbonate or butylene carbonate is employed, for example. Alternatively, cyclic ethers and/or compounds containing oxetane groups, such as dioxetanyl ethers, are employed as reactive diluents, and diols and/or polyols or mixtures thereof may also be employed as reactive diluents. Examples of the latter compounds include polyethylene glycol compounds and polypropylene glycol compounds. The stated examples of reactive diluents may be used in any desired mixtures. In some embodiments, the reactive diluent is employed in an amount of between 0.01 and 50 wt %, e.g., between 0.01 and 10 wt %.

Hardener components used for the cationic curing may include, for example, organic salts, such as organic ammonium, sulfonium, phosphonium, iodonium, or imidazolium salts, and also organic heterocycles, and any desired mixtures of the aforementioned compounds. Hardener components for the anionic curing may include tertiary amines or imidazole compounds. Hardener components for the anionic or cationic curing may include metal complex compounds.

In some embodiments, the onset temperature or the opening temperature for the encapsulation or for the release of the hardener component from the porous solid is situated in the region of 35° C. and 95° C., more particularly in the region of 50° C. and 80° C. The onset temperature or the opening temperature of the encapsulation of the hardener component used in the impregnating resin may be higher by 15° C. than that of the curing catalyst used in the porous insulating material.

In some embodiments, the impregnating resin further comprises various nanoparticles and/or mixtures of nanoparticles.

In some embodiments, the impregnating resin is also admixed with inorganic and/or organic microscale fillers or filler mixtures.

The insulation system may be implemented in electrical coils, e.g., for rotating electrical machines and high-voltage applications, by reducing the reliance on sensitizing acid anhydrides. The teachings of the present disclosure may provide:

Low operating viscosities as a result of catalysts with different thermal triggerabilities, permitting a broad working temperature window.

High storage stability as a result of use of a catalyst in the impregnating resin and a catalyst in the porous insulating material that have different response characteristics.

High storage stabilities in conjunction with high reactivity, as a result of introduction of the encapsulated catalyst having the quicker response characteristics at low temperature into the porous insulating material.

Good vacuum strength even at elevated temperature, owing to the low vapor pressure of the components.

Low moisture sensitivity on the part of the impregnating resin, being free from anhydride.

Simplified operation as a result of omission of the anhydride hardener component.

Enhanced environmental compatibility.

The present disclosure may be embodied in an insulation system for electrical machines, more particularly in the high-voltage range. The hardener component of the insulating system may comprise a thermally activatable component or an encapsulated component, or a component embedded in the pores of the solid to be impregnated.

What is claimed is:

1. An insulation system for electrical machines, the system comprising:
   an insulator comprising a porous insulating material;
   an impregnator comprising a catalytically or thermally curable resin material having oxirane functionalities, or a mixture of different reactive resin materials having oxirane functionalities; and
   at least one thermally activatable or encapsulated hardener material;
   wherein the system is free of acid anhydrides.

2. The insulation system as claimed in claim 1, further comprising the at least one hardener material deposited at least partially in the pores of the insulator.

3. The insulation system as claimed in claim 1, further comprising the at least one hardener material in solution in the impregnating resin.

4. The insulation system as claimed in claim 1, wherein the at least one hardener induces ionic polymerization of the reactive resin material or resin materials.

5. The insulation system as claimed in claim 1, further comprising a reactive diluent.

6. The insulation system as claimed in claim 1, further comprising a reactive diluent in an amount of 0.01 to 50 wt %.

7. The insulation system as claimed in claim 1, further comprising a reactive diluent selected from the group consisting of the following compounds: cyclic organic carbonates, cyclic ethers, diols, and/or polyols.

8. The insulation system as claimed in claim 1, wherein the hardener material is selected from the group consisting of the following compounds: organic salts, metal complex compounds, tertiary amines, imidazole compounds, and/or organic heterocycles.

9. The insulation system as claimed in claim 1 wherein the onset temperature of the hardener material, the opening temperature for the encapsulation, or the temperature for the release of the hardener material from the insulator material is in the region of 35° C. and 95° C.

10. An electric machine comprising:
    an electric coil with an insulation system,
    wherein the insulation system comprises
    an insulator comprising a porous insulating material;
    an impregnator comprising a catalytically or thermally curable resin material having oxirane functionalities, or a mixture of different reactive resin materials having oxirane functionalities;
    and at least one thermally activatable or encapsulated hardener material wherein the insulator system is free of acid anhydrides.

* * * * *